US012613552B2

(12) United States Patent
Kamada et al.

(10) Patent No.: US 12,613,552 B2
(45) **Date of Patent: *Apr. 28, 2026**

(54) SURFACE PROTECTION FILM FOR FLEXIBLE DISPLAY AND METHOD OF PRODUCING THEREOF

(71) Applicant: BANDO CHEMICAL INDUSTRIES, LTD., Hyogo (JP)

(72) Inventors: Yutaka Kamada, Hyogo (JP); Masahiro Yamaguchi, Hyogo (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 487 days.

This patent is subject to a terminal disclaimer.

(21) Appl. No.: 17/299,786

(22) PCT Filed: Nov. 29, 2019

(86) PCT No.: PCT/JP2019/046708

§ 371 (c)(1),
(2) Date: Jun. 4, 2021

(87) PCT Pub. No.: WO2020/116335

PCT Pub. Date: Jun. 11, 2020

(65) Prior Publication Data

US 2022/0017744 A1 Jan. 20, 2022

(30) Foreign Application Priority Data

Dec. 5, 2018 (JP) ................................. 2018-227957

(51) Int. Cl.
*G06F 1/16* (2006.01)
*B32B 27/40* (2006.01)
*G02B 1/14* (2015.01)

(52) U.S. Cl.
CPC ............ *G06F 1/1652* (2013.01); *B32B 27/40* (2013.01); *G02B 1/14* (2015.01)

(58) Field of Classification Search
CPC ......... G06F 1/1652; B32B 27/40; B32B 7/06; B32B 27/08; B32B 2250/244;
(Continued)

(56) References Cited

U.S. PATENT DOCUMENTS 11,141,963 B2 * 10/2021 Kamada ................ B32B 27/281
11,204,448 B2 * 12/2021 Kamada ............... C09D 175/06
(Continued)

FOREIGN PATENT DOCUMENTS

CN 105452409 3/2016
CN 106061725 10/2016
(Continued)

OTHER PUBLICATIONS

Machine translation of JP 2011-236335 A (Year: 2011).*
(Continued)

*Primary Examiner* — Callie E Shosho
*Assistant Examiner* — Steven A Rice
(74) *Attorney, Agent, or Firm* — JCIPRNET

(57) ABSTRACT

The present invention addresses the problem of providing a surface protection film for a flexible display in which creases are unlikely to remain. As a solution, provided is the surface protection film for a flexible display that has a protection layer made of polyurethane as an outermost surface thereof, the polyurethane having a stress relaxation rate of 30% or less after 300 seconds at an elongation of 50%.

7 Claims, 1 Drawing Sheet

(58) Field of Classification Search

CPC . B32B 2255/10; B32B 2457/20; B32B 27/16; B32B 2255/26; B32B 2307/748; B32B 27/36; G02B 1/14; C08G 18/10; C08G 18/24; C08G 18/3206; C08G 18/44; C08G 18/4854; C08G 18/6644; C08G 18/755; C08G 18/758

USPC ........................................................ 428/423.1

See application file for complete search history.

(56) References Cited

U.S. PATENT DOCUMENTS

| | | | | |
|---|---|---|---|---|
| 2008/0199704 | A1* | 8/2008 | Ho ........................... | B32B 27/36 156/60 |
| 2010/0032082 | A1* | 2/2010 | Ho ............................. | C09J 7/29 156/222 |
| 2015/0099113 | A1* | 4/2015 | Ho ........................... | B32B 27/36 156/244.11 |
| 2016/0168425 | A1 | 6/2016 | Imoto et al. | |
| 2016/0368236 | A1 | 12/2016 | Iwase | |
| 2017/0107398 | A1* | 4/2017 | Ho ........................ | C08G 18/242 |
| 2017/0170416 | A1 | 6/2017 | Johnson et al. | |
| 2018/0345639 | A1 | 12/2018 | Kamada et al. | |
| 2018/0371215 | A1* | 12/2018 | Tanaka ........................ | C08L 9/02 |
| 2020/0339840 | A1* | 10/2020 | Kamada ................... | B32B 27/40 |
| 2021/0001612 | A1* | 1/2021 | Kamada ................... | B32B 27/40 |

FOREIGN PATENT DOCUMENTS

| | | |
|---|---|---|
| CN | 108300361 | 7/2018 |
| CN | 108323163 | 7/2018 |
| CN | 108367553 | 8/2018 |
| JP | 2007137052 | 6/2007 |
| JP | 2011236335 A * | 11/2011 ............. C08G 18/10 |
| JP | 2012241117 A * | 12/2012 |
| JP | 2017156751 | 9/2017 |
| JP | 2018051906 | 4/2018 |
| KR | 1020140101829 | 8/2014 |
| TW | 201736143 | 10/2017 |
| WO | 2017094480 | 6/2017 |
| WO | 2017214105 | 12/2017 |
| WO | 2018005833 | 1/2018 |
| WO | 2018038069 | 3/2018 |
| WO | WO-2018221490 A1 * | 12/2018 ............... G02B 1/14 |
| WO | WO-2019177074 A1 * | 9/2019 ............... C09J 7/40 |

OTHER PUBLICATIONS

Petrovic, Zoran S., et al., "The Effect of Crosslinking on Properties of Polyurethane Elastomers", 1991, Journal of Applied Polymer Science, vol. 42, p. 396 (Year: 1991).*

Machine translation of JP 2012-241117 A (Year: 2012).*

Specialchem, "Duranol (TM) T5651", Sep. 12, 2017, p. 1, at https://www.specialchem.com/adhesives/product/asahi-kasei-duranol-t5651, archived at https://web.archive.org/web/20251114225855/https://www.specialchem.com/adhesives/product/asahi-kasei-duranol-t5651 (Year: 2017).*

"Office Action of Taiwan Counterpart Application", issued on Dec. 5, 2023, with English translation thereof, pp. 1-10.

"Office Action of China Counterpart Application", issued on Nov. 3, 2022, with English translation thereof, p. 1-p. 27.

"International Search Report (Form PCT/ISA/210) of PCT/JP2019/046708," mailed on Jan. 28, 2020, with English translation thereof, pp. 1-4.

"Office Action of Korea Counterpart Application", issued on Dec. 3, 2024, with English translation thereof, p. 1-p. 11.

* cited by examiner

SURFACE PROTECTION FILM FOR FLEXIBLE DISPLAY AND METHOD OF PRODUCING THEREOF

CROSS-REFERENCE TO RELATED APPLICATION

This application is a 371 of international application of PCT application serial no. PCT/JP2019/046708, filed on Nov. 29, 2019, which claims the priority benefit of Japan application no. 2018-227957, filed on Dec. 5, 2018. The entirety of each of the above-mentioned patent applications is hereby incorporated by reference herein and made a part of this specification.

TECHNICAL FIELD

The present invention relates to a surface protection film for protecting a transparent substrate on a flexible display surface.

BACKGROUND ART

In electronic devices including a display such as smart-phones, tablet PCs, and portable music players, in order to protect a transparent substrate on a display surface, a surface protection film is bonded thereto in some cases. A light transmission property, a non-coloring property, weather resistance, plasticizer resistance, an antifouling property, and the like are required for the surface protection film. In addition, electronic devices including a display that is operated through a capacitance touch panel have become common, and a feeling of writing with a touch pen, operability, scratch resistance, and a self-healing property for restoring a film pushed by a tip of the touch pen to its original state over time are newly required for the surface protection film.

Regarding such a surface protection film, for example, the applicants proposed a surface protection film in which three layers including a protection layer, a transparent substrate film, and an adhesive layer are laminated in that order in Patent Literature 1, wherein the protection layer is formed of a thermosetting polyurethane which is a cured product of a polyether polyol, an aliphatic isocyanate, an alcohol-based curing agent, and a non-amine catalyst. The applicants proposed a surface protection film in which three layers including a protection layer formed of a polycarbonate polyurethane, a transparent substrate film, and an adhesive layer are laminated in that order in Patent Literature 2.

In addition, in recent years, electronic devices using a flexible display that can be folded and rolled and which can be stored compactly while having a large screen when used have been put on the market. When a surface protection film is bonded to an electronic device using such a flexible display, creases may remain on the surface protection film when the display is unfolded after it is left folded for a while.

2

CITATION LIST

Patent Literature

[Patent Literature 1]
PCT International Publication No. WO 2017/094480
[Patent Literature 2]
PCT International Publication No. WO 2018/038069

SUMMARY OF INVENTION

Technical Problem

An objective of the present invention is to provide a surface protection film for a flexible display in which creases are unlikely to remain.

Solution to Problem

In order to achieve the above objective, the present invention has the following configurations.

1. A surface protection film for a flexible display having a protection layer formed of a polyurethane on its outermost surface, wherein the stress relaxation rate of the polyurethane after 300 seconds at an elongation of 50% is 30% or less.

2. The surface protection film for a flexible display according to 1, wherein the stress relaxation value of the polyurethane after 300 seconds at an elongation of 50% is 2 MPa or less.

3. The surface protection film for a flexible display according to 1 or 2, wherein the International Rubber Hardness Degree (IRHD) of the polyurethane is 87.0 or more and 98.0 or less.

4. The surface protection film for a flexible display according to any one of 1 to 3, wherein the polyurethane is a polycarbonate-based or a polyester-based.

5. The surface protection film for a flexible display according to any one of 1 to 4, wherein the thickness of the protection layer is 50 μm or more and 400 μm or less.

6. A method of producing a surface protection film for a flexible display having a protection layer formed of a polyurethane on its outermost surface, and in which the stress relaxation rate of the polyurethane after 300 seconds at an elongation of 50% is 30% or less, the method includ-ing: pouring a material composition into a gap between first and second gap maintaining members that are conveyed by a pair of rollers which are disposed apart from each other; and thermally curing the material composition that is held between the first and second gap maintaining members to form the protection layer.

7. The method of producing a surface protection film for a flexible display according to 6, wherein the stress relax-ation value of the polyurethane after 300 seconds at an elongation of 50% is 2 MPa or less.

8. The method of producing a surface protection film for a flexible display according to 6 or 7, wherein the polyure-thane is a polycarbonate-based or a polyester-based.

9. The method of producing a surface protection film for a flexible display according to any one of 6 to 8, wherein one of the first and second gap maintaining members is a film having unevenness, and the material composition is held on a side of the film having unevenness.

Advantageous Effects of Invention

The surface protection film of the present invention can be suitably used as a surface protection film for a flexible display because creases are unlikely to remain. The surface protection film of the present invention has an excellent light transmission property, a non-coloring property, and weather resistance by using a protection layer formed of a polyurethane. A surface protection film having an International Rubber Hardness Degree (IRHD) of 87.0 or more and 98.0 or less provides a favorable feeling of writing with a touch pen and a feeling of writing like that of writing on paper with a pencil.

The surface protection film including the protection layer having a thickness of 50 µm or more and 400 µm or less satisfies the optical characteristics that can be used as a surface protection film and it also has excellent self-healing properties. In addition, an anti-glare property can be imparted by forming unevenness on the surface of the protection layer.

A protection layer formed of a polycarbonate polyurethane has excellent plasticizer resistance and a protection layer formed of a polyester polyurethane has excellent plasticizer resistance and oil resistance. Therefore, these protection layers formed of a polyurethane are unlikely to become colored and swell even if they come in contact with various rubber products and oils.

A surface protection film laminate in which a mold release film and a release film are laminated on the surface protection film of the present invention can prevent scratches and contamination on the surface protection film and has excellent handling properties.

According to the production method of the present invention, it is possible to continuously produce the surface protection film. In addition, a protection layer having a thickness of 50 µm or more and 400 µm or less, which is not easily produced in a wet coating method, can be produced without deterioration of optical characteristics. In addition, according to a transfer method, unevenness can be easily formed on the surface of the protection layer.

DESCRIPTION OF EMBODIMENTS

Figure 1:
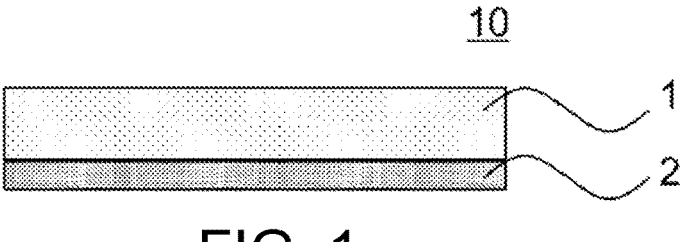
FIG. 1 is a diagram showing a surface protection film according to an embodiment of the present invention.
Figure 2:
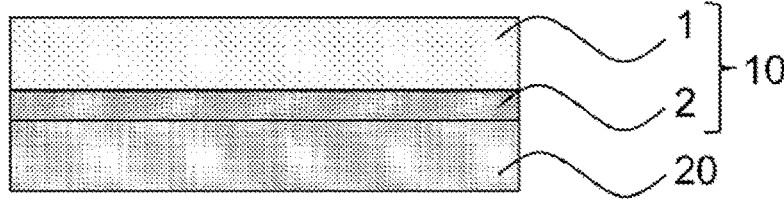
FIG. 2 is a diagram showing a state in which a surface protection film according to an embodiment of the present invention is bonded to a transparent substrate on a flexible display surface.

FIGS. 1 and 2 show a surface protection film according to an embodiment of the present invention, and a state in which the surface protection film according to the embodiment is bonded to a transparent substrate positioned on a flexible display surface. Here, in FIGS. 1 and 2, the thicknesses of the layers do not reflect actual thicknesses.

In a surface protection film 10 according to an embodiment, a protection layer 1 formed of a polyurethane and an adhesive layer 2 are laminated in that order. In addition, the surface protection film 10 according to the embodiment is bonded to a transparent substrate 20 with the adhesive layer 2 therebetween. In this manner, the surface protection film of the present invention is adhered to the surface of the transparent substrate, and thus prevents scratches, cracks, contamination, and the like on the transparent substrate.

"Protection Layer"

The protection layer is formed of a polyurethane. The polyurethane is a cast type thermosetting polyurethane obtained by thermally curing liquid material compositions including at least a polyol, an isocyanate, and an alcohol-based curing agent. Here, in the present invention, the polyurethane used to form the protection layer can contain various additives such as a colorant, a light stabilizer, a heat stabilizer, an antioxidant, an antifungal agent, a flame retardant, and a lubricant as necessary within a range in which required characteristics are not impaired.

a. Polyol

Regarding the polyol, polyoxyalkylene glycols such as polyethylene glycol, polypropylene glycol, and polyoxytetramethylene glycol or polyether polyols which are alkylene oxide adducts of bisphenol A, and glycerin, such as those of ethylene oxide, and propylene oxide; polyester polyols obtained by a polymerization reaction of a dibasic acid such as adipic acid, phthalic anhydride, isophthalic acid, maleic acid, and fumaric acid and glycols such as ethylene glycol, propylene glycol, 1,4-butanediol, 1,6-hexanediol, and trimethylolpropane; polycaprolactone polyols such as polycaprolactone glycol, polycaprolactone triol, and polycaprolactone tetraol; polycarbonate polyols such as polycarbonate glycol, polycarbonate triol, and polycarbonate tetraol; and derivatives thereof in which a side chain or a branched structure is introduced thereinto, modified products thereof, a mixture thereof and the like can be used.

Among these, a polycarbonate polyurethane obtained from a polycarbonate polyol has excellent plasticizer resistance and can prevent swelling thereof and transfer of a plasticizer therefrom due to contact with a rubber product or the like. In addition, a polyester polyurethane obtained from a polyester polyol has excellent plasticizer resistance and oil resistance and can prevent swelling thereof and transfer of a plasticizer and various oil components such as hand cream and sunscreen therefrom.

a1. Polycarbonate Polyol

Examples of polycarbonate polyols include a reaction product of a dialkyl carbonate and a diol. In addition, as a polycarbonate polyol, for example, a polycarbonate glycol, a polycarbonate triol, a polycarbonate tetraol, derivatives thereof in which a side chain or a branched structure is introduced thereinto, modified products thereof, a mixture thereof, and the like can be used.

Examples of dialkyl carbonates include dialkyl carbonates such as dimethyl carbonate and diethyl carbonate, a diaryl carbonate such as diphenyl carbonate, and an alkylene carbonate such as ethylene carbonate. These may be used alone or two or more thereof may be used in combination.

Examples of diols include 1,4-butanediol, diethylene glycol, 1,5-pentanediol, 1,6-hexanediol, 1,7-heptanediol, 1,8-octanediol, 2-methyl-1,8-octanediol, 1,9-nonanediol, 1,10-dodecanediol, 2-ethyl-1,6-hexanediol, 3-methyl-1,5-pentanediol, 2,4-dimethyl-1,5-pentanediol, neopentyl glycol, 1,3-cyclohexanediol, 1,4-cyclohexanediol, 1,4-cyclohexanedimethanol, and 2,2'-bis(4-hydroxycyclohexyl)-propane. These may be used alone or two or more thereof may be used in combination. Regarding the diol, an aliphatic diol or alicyclic diol having 4 to 9 carbon atoms is preferable, for example, preferably, 1,4-butanediol, diethylene glycol, 1,5-pentanediol, 1,6-hexanediol, 3-methyl-1,5-pentanediol, 2,4-dimethyl-1,5-pentanediol, 1,4-cyclohexanedimethanol, 1,7-heptanediol, 1,8-octanediol, 2-methyl-1,8-octanediol, or 1,9-nonanediol is used alone or two or more thereof are used in combination. In addition, those having no branched structure are more preferable.

a2. Polyester Polyol

Examples of polyester polyols include polyester polyols obtained by a polymerization reaction of a dibasic acid such as succinic acid, adipic acid, phthalic anhydride, isophthalic acid, maleic acid, and fumaric acid, and glycols such as ethylene glycol, propylene glycol, 1,4-butanediol, 1,6-hexanediol, and trimethylolpropane. Among these, a succinate polyurethane using succinic acid as a dibasic acid is particularly preferable because it has excellent oil resistance.

The number-average molecular weight of the polyol is preferably 200 or more and 10,000 or less, more preferably 500 or more and 5,000 or less, and still more preferably 800 or more and 3,000 or less. When the number-average molecular weight is less than 200, a reaction occurs too fast, handling properties deteriorate, and a molded product may lose flexibility and become brittle. On the other hand, when the number-average molecular weight is greater than 10,000, the viscosity becomes too high, handling properties deteriorate, and a molded product may crystallize and become opaque. Here, the number-average molecular weight referred to in the present invention is a molecular weight that is calculated from a hydroxyl value of a polyol measured according to JIS K 1557. However, values beyond the above numerical value range are not excluded as long as they are within the spirit and scope of the present invention.

b. Isocyanate

The isocyanate can be used without particular limitation as long as it has two or more isocyanate groups in a molecule. For example, tolylene diisocyanate, tolidine diisocyanate, diphenylmethane diisocyanate, polymethylene polyphenyl polyisocyanate, carbodiimidated diphenylmethane polyisocyanate, crude diphenylmethane diisocyanate, xylylene diisocyanate, 1,5-naphthalene diisocyanate, tetramethylxylylene diisocyanate, isophorone diisocyanate, hydrogenated diphenylmethane diisocyanate, hydrogenated xylylene diisocyanate, hexamethylene diisocyanate, dimer acid diisocyanate, norbornene diisocyanate, and the like can be used. Among these, two or more types may be used in combination.

In the present invention, in the polyurethane used to form the protection layer, as an isocyanate component, an aliphatic isocyanate having no aromatic ring is preferably used. The polyurethane obtained from an aliphatic isocyanate is unlikely to yellow and can prevent deterioration of transparency due to discoloration of the polyurethane caused by light and heat from a light source, sunlight, and the like.

c. Alcohol-Based Curing Agent

In the polyurethane used to form the protection layer of the present invention, an alcohol-based curing agent is used as a curing agent. The alcohol-based curing agent has a weaker adverse effect on human bodies and the environment than an amine curing agent.

The alcohol-based curing agent can be used without particular limitation as long as it has two or more hydroxy groups in a molecule. For example, dihydric alcohols such as ethylene glycol, 1,3-propanediol, 2-methyl-1,3-propanediol, 1,3-butanediol, 1,4-butanediol, 1,5-pentanediol, neopentyl glycol (2,2-dimethyl-1,3-propanediol), 1,6-hexanediol, polyethylene glycol, polypropylene glycol, polybutylene glycol, cyclohexane dimethanol, and a hydrogenated bisphenol A, trihydric alcohols such as glycerin, trimethylolpropane, butanetriol, pentanetriol, hexanetriol, cyclopentanetriol, and cyclohexanetriol, and trivalent or higher alcohols such as pentaerythritol, dipentaerythritol, and tetramethylolpropane may be exemplified. Among these, regarding the dihydric alcohol, 1,4-butanediol is preferable in consideration of handling properties and mechanical properties, and in order to prevent opacity, a dihydric alcohol having a cyclic structure such as cyclohexanedimethanol and hydrogenated bisphenol A is preferable. Regarding the trihydric alcohol, trimethylolpropane is preferable in consideration of handling properties and mechanical properties.

When a dihydric alcohol is used alone as an alcohol curing agent, the molded product may crystallize and become opaque, and when a trihydric alcohol is used as a main component, the strength may decrease. Therefore, it is preferable to use a dihydric alcohol and a trihydric alcohol in combination. Specifically, it is preferable to use a dihydric alcohol in a range of 40 to 100 parts by weight and a trihydric alcohol in a range of 60 to 0 parts by weight, and it is more preferable to use a dihydric alcohol in a range of 60 to 80 parts by weight and a trihydric alcohol in a range of 40 to 20 parts by weight. Thus, if the molded product becomes opaque when 1,4-butane diol is used as a dihydric alcohol, some or all of the 1,4-butane diol may be replaced with a dihydric alcohol having a cyclic structure such as cyclohexanedimethanol and hydrogenated bisphenol A.

d. Catalyst

Preferably, the polyurethane used to form the protection layer of the present invention is thermally cured in the presence of a non-amine catalyst. When the non-amine catalyst is used, it is possible to obtain a polyurethane having an excellent non-coloring property, transparency, and weather resistance. On the other hand, in a polyurethane that is thermally cured in the presence of an amine catalyst, emitted light turns yellow and an appearance becomes colored over time in some cases. Examples of non-amine catalysts include an organic tin compound such as di-n-butyl tin dilaurate, dimethyl tin dilaurate, dibutyltin oxide, and octane tin, an organic titanium compound, an organic zirconium compound, a carboxylic acid tin salt, and bismuth carboxylate. Among these, an organic tin compound is preferable because in this case a reaction rate is easily adjusted.

0.0005 weight % or more and 3.0 weight % or less of the non-amine catalyst is preferably added with respect to the total amount of the above a. to c. When the proportion is less than 0.0005 weight %, the reaction rate is not sufficiently high, and it is not possible to efficiently obtain a molded product in some cases. When the proportion is higher than 3.0 weight %, the reaction rate is too high, and thus problems may occur, such as, for example, it not being possible to obtain a molded product with a uniform thickness, heat resistance and weather resistance of the molded product deteriorating, light transmittance being lowered, and the molded product becoming colored. However, values beyond the above numerical value range are not excluded as long as they are within the spirit and scope of the present invention.

e. Silicon-Based Additive

In the surface protection film of the present invention, the polyurethane used to form the protection layer preferably contains a silicone-based additive. When the polyurethane contains a silicone-based additive, slipperiness is improved, and it is possible to perform an operation on a touch panel with a touch pen, a finger, or the like comfortably. The lower limit of the amount of the silicone-based additive added is preferably 0.05 weight % or more, more preferably 0.1 weight % or more, and most preferably 0.3 weight % or more with respect to a total amount of the above a. to c. In addition, the upper limit of the amount of the silicone-based additive added is preferably 10.0 weight % or less, more preferably 9.0 weight % or less, and most preferably 7.0 weight % or less with respect to a total amount of the above a. to c. When the amount of the silicone-based additive added is less than 0.05 weight %, improvement in slipperiness may not be sufficient, and when the amount of the silicone-based additive added is larger than 10.0 weight %, slipperiness conversely becomes too high, and the pen tip of the touch pen may slide too much. However, values beyond the above numerical value range are not excluded as long as they are within the spirit and scope of the present invention.

The silicone-based additive can be contained in the polyurethane by adding it to material compositions before the polyurethane is thermally cured and thermally curing the material compositions. In addition, regarding the silicone-based additive, a non-reactive additive that does not form a covalent bond with a crosslinked network formed by a polyol, an isocyanate, and an alcohol-based curing agent is preferably used. Since the non-reactive silicone-based additive gradually bleeds out to the surface of the protection layer, it is possible to impart slipperiness over a long time. Silicone-based additives can be used without particular limitation as long as they are not phase-separated from the material composition before thermal curing. For example, a polyether-modified polydimethylsiloxane, a polyaralkyl-modified polydimethylsiloxane, and a long chain alkyl-modified polydimethylsiloxane can be used. Specifically, the commercial products KF352A, KF615A, X22-4515, KF410, KF412, and the like (commercially available from Shin-Etsu Chemical Co., Ltd.) can be used.

The protection layer is a molded product formed of a cast type thermosetting polyurethane obtained by thermally curing liquid material compositions including at least a polyol, an isocyanate, and an alcohol-based curing agent in the presence of a catalyst, and regarding a molding method thereof, any of a one shot method, a prepolymer method, and a quasi-prepolymer method may be used.

In the one shot method, a polyol, an isocyanate, an alcohol-based curing agent, optional additives, and a catalyst are added together and thermally cured, and thereby a polyurethane molded product can be produced.

In the prepolymer method, a polyol and a stoichiometrically excessive amount of an isocyanate are reacted to prepare a prepolymer having an isocyanate group at its end in advance, predetermined amounts of an alcohol-based curing agent, optional additives, and a catalyst are mixed thereinto, the prepolymer is thermally cured, and thereby a polyurethane molded product can be produced.

In the quasi-prepolymer method, some of a polyol is mixed with an alcohol-based curing agent in advance, the remaining polyol and an isocyanate are used to prepare a prepolymer, a mixture in which a polyol, an alcohol-based curing agent, optional additives, and a catalyst are mixed together in advance is mixed thereinto, the mixture is thermally cured, and thereby a polyurethane molded product can be produced.

In the present invention, in the material compositions before the polyurethane is thermally cured, a ratio of the number of moles of hydroxyl groups (—OH) included in an alcohol-based curing agent to the number of moles of isocyanate groups (—NCO) of an isocyanate or a prepolymer (—OH/—NCO: hereinafter referred to as an α ratio) is preferably 0.8 or more and 1.5 or less. When the α ratio is less than 0.8, mechanical properties are unstable, and when the α ratio is greater than 1.5, surface adhesiveness increases, and a favorable writing feeling is impaired. In addition, the α ratio is more preferably 1.05 or more and 1.3 or less because then the polyurethane constituting the protection layer is appropriately deformed and scratch resistance is improved.

In addition, the polyurethane preferably does not have an acrylic skeleton (an acrylic skeleton or a methacrylic skeleton). That is, the polyurethane used to form the protection layer of the present invention preferably does not contain an acrylic-modified polyurethane. A polyurethane having an acrylic skeleton may impair the flexibility of the polyurethane and lower the mechanical strength such as wear resistance and tear strength, and emitted light may be colored due to a residue of the catalyst used to introduce an acrylic skeleton or a methacrylic skeleton.

In the surface protection film of the present invention, the stress relaxation rate of the polyurethane used to form the protection layer after 300 seconds at an elongation of 50% is 30% or less. When the stress relaxation rate of the polyurethane used to form the protection layer is 30% or less, creases are unlikely to remain because stress generated at the deformed portion remains without any relaxation over time. On the other hand, in polyurethane in which the stress relaxation rate after 300 seconds at an elongation of 50% is larger than 30%, creases are likely to remain because stress generated at the deformed portion is relaxed over time, and it is difficult for it to return to the original shape. In the present invention, the stress relaxation rate is more preferably 25% or less and still more preferably 23% or less.

In the surface protection film of the present invention, the stress relaxation value of the polyurethane used to form the protection layer after 300 seconds at an elongation of 50% is preferably 2 MPa or less. When the stress relaxation value of the polyurethane used to form the protection layer is 2 MPa or less, since stress for restoring it to the original shape remains after it is left in a deformed state, creases are unlikely to remain. In the present invention, the stress relaxation value is more preferably 1.5 MPa or less and still more preferably 1.0 MPa or less.

The surface protection film of the present invention preferably has an International Rubber Hardness Degree (IRHD) of polyurethane of 87.0 or more and 98.0 or less. When the International Rubber Hardness Degree is less than 87.0, a pen tip is pushed too much into the protection layer during an operation with a touch pen, and the movement of the pen becomes heavy. On the other hand, when the International Rubber Hardness Degree is larger than 98.0, since a pen tip is not pushed into the protection layer, a feeling of resistance during an operation with a touch pen is reduced and the movement of the pen becomes too light.

Here, the stress relaxation rate, the stress relaxation value, and the hardness can be adjusted by designing the distance between crosslinking points and controlling the morphology of hard segments/soft segments, and specifically, can be adjusted according to the molecular skeleton and molecular weight of urethane soft segments constituting polyurethane, the number of functional groups, the number of hard segments, formulation proportions of divalent/trivalent alcohol-based curing agents, and the like.

The thickness of the protection layer is preferably 50 μm or more and 400 μm or less and more preferably 100 μm or more and 300 μm or less. When the protection layer has a thickness of 50 μm or more and 400 μm or less, a writing feeling with a touch pen and slipperiness become very favorable and operability and a self-restoring property are also excellent. When the thickness of the protection layer is less than 50 μm, a writing feeling and a self-restoring property deteriorate. When the thickness of the protection layer is larger than 400 μm, a writing feeling, slipperiness, operability, and a self-restoring property deteriorate and it is difficult to perform molding with a uniform thickness. When the thickness of the protection layer is 50 μm or more and 400 μm or less, performance required for the surface protection film is exhibited in a well-balanced manner, and the production is easy.

"Adhesive Layer"

The adhesive layer is used to bond the surface protection film to the transparent substrate on a flexible display surface. The type of the adhesive is not particularly limited, and an adhesive formed of an acrylic resin, an epoxy resin, a urethane resin, or a silicon resin can be used. Among these, an adhesive formed of an acrylic resin can also be adhered to a transparent substrate on which a surface treatment such as an antifouling treatment or a low reflection treatment has been performed. In addition, an adhesive formed of a silicon resin has an excellent wetting property, causes fewer bubbles when it is adhered to a transparent substrate, has favorable removability, and is unlikely to leave an adhesive residue when peeled off. The thickness of the adhesive layer is generally within a range of 5 μm or more and 60 μm or less, and can be appropriately adjusted according to required specifications.

"Surface Protection Film"

In the surface protection film 10 according to the embodiment, two layers including the protection layer 1 formed of polyurethane and the adhesive layer 2 are laminated in that order. The surface protection film of the present invention is not limited to the embodiment, and for example, it can also include a transparent substrate film that supports a protection film, an intermediate layer for improving adhesion between layers, a blue light cut layer that cuts out blue light, and the like.

The haze value of the surface protection film is preferably 0.1% or more and 40% or less. In addition, the total light transmittance of the surface protection film is preferably 90% or more. When the haze value is greater than 40% or the total light transmittance is less than 90%, the visibility of the display deteriorates. However, when a blue light cut layer that cuts out visible light in a blue range is provided, the total light transmittance is preferably 60% or more. When the haze value of the surface protection film is 0.1% or more and less than 3%, a clear appearance can be obtained. When the haze value of the surface protection film is 3% or more and 40% or less, it is possible to impart an anti-glare property to the surface protection film. In addition, with the surface protection film having an anti-glare property, scratches on the surface of the protection layer are less noticeable. When the haze value of the surface protection film is 3% or more and 40% or less, unevenness may be formed on the surface of the protection layer. An irregular shape of the surface of the protection layer is not particularly limited as long as it has the above haze value and total light transmittance, and may be appropriately adjusted according to a refractive index, light absorbency, and the like of a material to be used, and in general, an average length (RSm) of a roughness curve element is about 10 μm or more and 80 μm or less. In addition, the arithmetic average roughness Ra is about 0.01 μm or more and 0.3 μm or less, and the maximum height Rz is about 0.1 μm or more and 2.0 μm or less.

Figure 3:
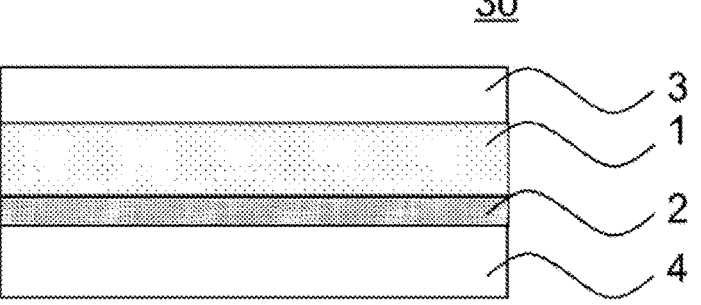
FIG. 3 is a diagram showing a surface protection film laminate.

In order to protect the surface protection film of the present invention until it is attached to the transparent substrate on the flexible display surface, a mold release film can be adhered to a surface on the side of the protection layer of the surface protection film and a release film can be adhered to the other surface to obtain a surface protection film laminate. FIG. 3 shows a surface protection film laminate 30 in which a mold release film 3 and a release film 4 are adhered to the surface protection film 10 according to the embodiment. Here, in FIG. 3, the thicknesses of the layers do not reflect actual thicknesses.

The mold release film is provided to prevent contamination, adhesion of dust, scratches, and the like on the protection layer, and a film subjected to a mold release treatment on a surface on the side to be bonded to the protection layer is preferably used. When the mold release film on which a mold release treatment is performed is peeled off the protection layer, a mold release agent is transferred to the surface of the protection layer, slipperiness can be imparted to the surface of the protection layer immediately after the mold release film is peeled off, and a touch operation can be performed without discomfort immediately after use thereof starts. In addition, as will be described in detail in the following "Method of producing a protection layer," the protection layer can be molded directly on the mold release film. In this case, in order to prevent deformation due to heat when the material composition is thermally cured to form a protection layer, the thickness of the mold release film is preferably 50 μm or more and 300 μm or less, and a thicker film is more preferable.

In order to prevent contamination, adhesion of dust, a decrease in adhesive strength, and the like, the release film is preferably bonded to the adhesive layer. The release film is not particularly limited, and a film subjected to a mold release treatment on a surface on the side to be bonded to the adhesive layer can be suitably used.

"Method of Producing a Protection Layer"

The protection layer can be produced when an uncured material composition is sent to a gap between first and second gap maintaining members that are conveyed by a pair of rollers which are disposed apart from each other, the material composition that is held between the two gap maintaining members is introduced into a heating device, and the material composition is thermally cured to obtain a polyurethane. The material composition contains at least a polyol, an isocyanate (a urethane prepolymer composed of these), and an alcohol-based curing agent.

Figure 4:
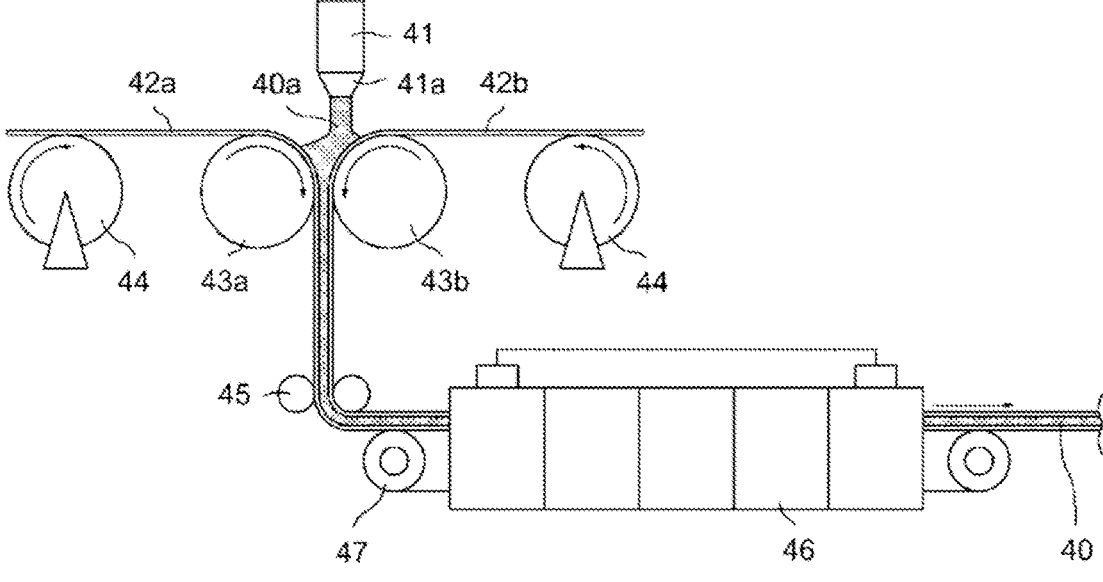
FIG. 4 is a diagram showing a method of producing a protection layer of a surface protection film.

FIG. 4 is a schematic diagram illustrating a method of producing a protection layer. Hereinafter, the method of producing a protection layer will be described with reference to FIG. 4.

A material composition 40a is sent to a gap between first and second gap maintaining members 42a and 42b that are conveyed by a pair of transport rollers 43a and 43b which are disposed apart from each other using a casting machine 41. The first and second gap maintaining members 42a and 42b are introduced into a heating device 46 while holding the material composition 40a therebetween. The material composition 40a that is held between the first and second gap maintaining members 42a and 42b is thermally cured, and thereby a polyurethane sheet-like article 40 is obtained. Here, in FIG. 4, 44 indicates a transport roller for conveying the first and second gap maintaining members 42a and 42b, 45 indicates an auxiliary roller, and 47 indicates a conveyor belt through which the first and second gap maintaining members 42a and 42b that hold the material composition 40a are transported into the heating device 46.

The first and second gap maintaining members 42a and 42b can be used without particular limitation as long as they are materials that do not thermally deform when the material composition is thermally cured. For example, an elongated film made of a polymer material such as polyethylene terephthalate (PET), polyethylene naphthalate (PEN), polycarbonate (PC), a cyclic olefin resin (COP), or a polyimide (PI) can be used. Here, in the schematic diagram shown in FIG. 4, an elongated film made of a polymer material is used as a gap maintaining member. However, an endless belt made of such a polymer material or a metal material such as aluminum can be used.

Since the first and second gap maintaining members 42*a* and 42*b* that hold the material composition 40*a* therebetween are pulled at the same tension and transported, a gap therebetween can be maintained at a constant size. The material composition 40*a* that is interposed between the first and second gap maintaining members 42*a* and 42*b* is cured while a constant thickness is maintained, and thereby a sheet-like article 40 having excellent thickness accuracy is obtained. According to the production method, it is possible to continuously mold the sheet-like article 40 having a thickness of 50 μm or more, which is not easily applied by coating, and having practical optical characteristics as a protection layer of the surface protection film.

A position of a head part 41*a* of the casting machine 41 is preferably unevenly located on the side of one of the transport rollers rather than at the center of the transport rollers 43*a* and 43*b* (the center of the gap formed by the first and second gap maintaining members 42*a* and 42*b*), and an unevenly distributed distance is preferably equal to or less than the radius of the transport roller. That is, a part directly below the head part 41*a* of the casting machine 41 is preferably positioned from the center of the pair of transport rollers 43*a* and 43*b* to the central axis of one transport roller. In addition, the shortest distance between a tip of the head part 41*a* and the surface of the transport roller is preferably 5 cm or less. When the head part 41*a* is provided in this manner, it is possible to further improve thickness accuracy of the sheet-like article 40, bubbles are unlikely to enter the uncured material composition 40*a* sent to the gap between the first and second gap maintaining members 42*a* and 42*b*, and entrained bubbles can easily escape.

The transport rollers 43*a* and 43*b* may simply have only a transport function, but are preferably heating rollers. When the transport rollers are heating rollers, the material composition 40*a* can be cured immediately after it is held in the gap between the first and second gap maintaining members 42*a* and 42*b*, it is possible to maintain the thickness more uniformly until the material composition 40*a* is introduced into the heating device 46, and it is possible to mold the sheet-like article 40 having superior thickness accuracy. When the transport roller is heated, a transport surface temperature is preferably set to 10° C. or higher and 60° C. or lower. When the temperature is lower than 10° C., the viscosity of the material composition 40*a* increases, bubbles cannot easily escape, a curing reaction occurs slowly, and the thickness accuracy of the sheet-like article 40 decreases. When the temperature exceeds 60° C., the material composition 40*a* may be cured on the transport roller, and bubbles may enter the sheet-like article 40.

The heating device 46 is a heating furnace including a heater, and may be any device that can increase the temperature in the furnace to a curing temperature of the material composition 40*a*. In addition, heating conditions (curing conditions) in the heating device 46 are not particularly limited, and may be appropriately set according to a composition of the material composition 40*a*. For example, conditions of 40° C. or higher and 160° C. or lower, and 1 minute or longer and 180 minutes or shorter may be set. An elongated laminate including the first gap maintaining member 42*a*, the polyurethane sheet-like article 40, and the second gap maintaining member 42*b* is unloaded from the heating device 46. Then, the sheet-like article 40 of the elongated laminate becomes the protection layer of the surface protection film of the present invention.

"Method of Producing Surface Protection Film Laminate"

In the above production method, one of the first gap maintaining member 42*a* and the second gap maintaining member 42*b* can serve as the mold release film 3, and the other thereof can serve as the release film 4. In this case, regarding the release film 4, a transfer film which includes the adhesive layer 2 and can transfer the adhesive layer 2 to the polyurethane sheet-like article 40 is used. When the first gap maintaining member 42*a* serves as the mold release film 3, and the second gap maintaining member 42*b* serves as the release film 4 and the adhesive layer 2, an elongated laminate including the first gap maintaining member 42*a* serving as a mold release film, the polyurethane sheet-like article 40 serving as a protection layer, and the second gap maintaining member 42*b* serving as a release film and an adhesive layer is unloaded according to the above production method.

According to this production method, the surface protection film laminate 30 can be continuously produced in a so-called roll-to-roll manner. Since the produced surface protection film laminate 30 includes the mold release film 3 and the release film 4 on both surfaces, it can prevent scratches, contamination, and the like on the surface protection film, and it has excellent handling properties.

The surface protection film laminate that is wound in a roll form may be shipped or the surface protection film laminate that is cut into a sheet form may be shipped. In addition, an elongated laminate including the first gap maintaining member 42*a*, the polyurethane sheet-like article 40, and the second gap maintaining member 42*b*, or the elongated laminate that is cut into a sheet-like laminate may be shipped, and the adhesive layer may be formed by coating in a display factory or the like, and can be bonded to a transparent substrate of a flexible display.

Here, the above production method is only an example, and for example, a releasable film can be used as the second gap maintaining member 42*b*, and after it is peeled off, the adhesive layer can be provided by coating or the like. In addition, a film having unevenness may be used as the first gap maintaining member 42*a*, the material composition 40*a* may be held on a surface having unevenness, and thereby unevenness can be transferred to the outermost surface of the sheet-like article 40, and an anti-glare property can be imparted to the obtained protection layer.

EXAMPLES

The present invention will be described below in further detail with reference to examples, but the present invention is not limited to these examples.

Example 1

4.6 g of 1,4-butane diol, 1.2 g of trimethylolpropane, 22.8 g of isophorone diisocyanate (IPDI), and 50 ppm of an organic tin compound were added to 71.5 g of a polycarbonate diol (product name: NIPPOLLAN 980R commercially available from Tosoh Corporation), and the mixture was stirred and mixed to obtain a material composition.

A silicon-treated PET film having a thickness of 125 μm was used as first and second gap maintaining members, and a surface protection film laminate having a protection layer having a thickness of 150 μm was produced according to the above production method.

Example 2

A surface protection film laminate was obtained in the same manner as in Example 1 except that 2.3 g of 1,4-butane diol, 3.5 g of trimethylolpropane, 29.5 g of isophorone diisocyanate (IPDI), and 50 ppm of an organic tin compound were added to 64.7 g of a polycarbonate diol (product name: NIPPOLLAN 965 commercially available from Tosoh Corporation), and the mixture was stirred and mixed to obtain a material composition.

Example 3

A surface protection film laminate was obtained in the same manner as in Example 1 except that 5.6 g of 1,4-butane diol, 3.7 g of trimethylolpropane, 34.0 g of norbornene diisocyanate (NBDI), and 50 ppm of an organic tin compound were added to 56.7 g of a polycarbonate diol (product name: NIPPOLLAN 965 commercially available from Tosoh Corporation), and the mixture was stirred and mixed to obtain a material composition.

Example 4

A prepolymer composed of PTMG having a molecular weight of 1,000 (product name: PTMG1000 commercially available from Mitsubishi Chemical Corporation) and hydrogenated MDI was prepared at NCO %=10.0%. Then, a surface protection film laminate was obtained in the same manner as in Example 1 except that 3.56 g of 1,4-butane diol, 5.34 g of trimethylolpropane, and 50 ppm of an organic tin compound were added to 100 g of a prepolymer, and the mixture was stirred and mixed to obtain a material composition.

Comparative Example 1

A surface protection film laminate was obtained in the same manner as in Example 1 except that 7.6 g of 1,4-butane diol, 1.9 g of trimethylolpropane, 31.1 g of IPDI, and 50 ppm of an organic tin compound were added to 59.3 g of a polycarbonate diol (product name: NIPPOLLAN 980R commercially available from Tosoh Corporation), and the mixture was stirred and mixed to obtain a material composition.

Comparative Example 2

A surface protection film laminate was obtained in the same manner as in Example 1 except that 6.7 g of 1,4-butane diol, 2.9 g of trimethylolpropane, 31.1 g of IPDI, and 50 ppm of an organic tin compound were added to 59.3 g of a polycarbonate diol (product name: NIPPOLLAN 980R commercially available from Tosoh Corporation), and the mixture was stirred and mixed to obtain a material composition.

Comparative Example 3

A surface protection film laminate was obtained in the same manner as in Example 1 except that 5.7 g of 1,4-butane diol, 3.8 g of trimethylolpropane, 31.1 g of IPDI, and 50 ppm of an organic tin compound were added to 59.3 g of a polycarbonate diol (product name: NIPPOLLAN 980R commercially available from Tosoh Corporation), and the mixture was stirred and mixed to obtain a material composition.

Comparative Example 4

A surface protection film laminate was obtained in the same manner as in Example 1 except that 7.6 g of 1,4-butane diol, 1.9 g of trimethylolpropane, 36.7 g of IPDI, and 50 ppm of an organic tin compound were added to 53.8 g of polycarbonate diol (product name: NIPPOLLAN 965 commercially available from Tosoh Corporation), and the mixture was stirred and mixed to obtain a material composition.

The surface protection film laminates produced in Examples 1 to 4 and Comparative Examples 1 to 4 were evaluated as follows. The results are shown in Table 1.

Stress Relaxation Value and Stress Relaxation Rate

The prepared surface protection film laminate was punched out with a JIS-1 dumbbell to obtain a test piece. Using a tensile testing machine (commercially available from INSTRON: 3365Q4986), the distance between chucks was set to 4 cm, and the sample was then set. Elongation was performed until the distance between chucks reached 6 cm, and the stress at that time was used as the initial stress. The stress after 300 seconds was read as stress after 300 seconds. The measurement was performed at N=3, an average value thereof was used as the measured value, and the stress relaxation value and the stress relaxation rate were determined according to the following formula.

$$\text{Stress relaxation value (MPa)} = \text{initial stress (at an elongation of 50\%)} - \text{stress after 300 seconds (at an elongation of 50\%)}$$

$$\text{Stress relaxation rate (\%)} = \text{stress relaxation value} / \text{initial stress} \times 100$$

Crease

A 50 mm×100 mm sample was cut out from the prepared surface protection film laminate, the films on both sides were peeled off, and the sample was then folded in half, and bonded with a pressure contact roller (air pressure: 0.5 MPa) under conditions of one reciprocation, and left at room temperature (25° C.) for 7 days. Then, the folded sample was peeled off and left on the surface plate, with the convex surface facing down. After it was left for 10 minutes, the height of the surface protection film at the highest position from the surface plate was measured. In addition, light was reflected so that a straight tubular three-wavelength tube was shown to straddle crease portions, and the shape of the shown three-wavelength tube was visually checked and evaluated according to the following criteria.

○: The three-wavelength tube was shown as a straight line without change at the crease portion.

x: The three-wavelength tube was shown with distortion at the crease portion.

International Rubber Hardness Degree (IRHD)

A 1 cm square sample was cut out from the prepared surface protection film laminate, the films on both sides were peeled off, and the hardness on the side of the protection layer was then measured using an IRHD rubber hardness tester (commercially available from Hilde) according to JIS K 6253-2.

Tensile Test (M100, M300, Tensile Strength, Breaking Elongation)

The prepared surface protection film laminate was punched out with a JIS-3 dumbbell, and the films on both sides were peeled off to obtain a test piece. Measurement was performed using a tensile testing machine (commercially available from INSTRON: 3365Q4986) under conditions of a tensile speed: 500 mm/min. The measurement was performed at N=3, and an average value thereof was used as the measured value.

Tear Strength (Tensile Test)

The prepared surface protection film laminate was punched out with a JIS-B dumbbell, and the films on both sides were peeled off to obtain a test piece. Measurement was performed using a tensile testing machine (commercially available from INSTRON: 3365Q4986) under conditions of a tensile speed: 500 mm/min. The measurement was performed at N=3, and an average value thereof was used as the measured value.

Permanent Elongation

The prepared surface protection film laminate was punched out with a JIS-1 dumbbell, and the films on both sides were peeled off to obtain a test piece. A 4 cm marked line was marked on the test piece, and the test piece was elongated using a measuring tool until the distance between marked lines reached 6 cm. After it was left for 10 minutes, the test piece was removed from the measuring tool, after it was then left for 10 minutes, the distance between marked lines was measured, and the permanent elongation was calculated according to the following formula.

Permanent elongation (%)=distance between marked lines (after test)-distance between marked lines (before test)/distance between marked lines (before test)×100

TABLE 1

| | Example 1 | Example 2 | Example 3 | Example 4 |
|---|---|---|---|---|
| Stress relaxation value (MPa) | 0.17 | 0.31 | 0.46 | 0.33 |
| Stress relaxation rate (%) | 10.2 | 19.1 | 25.6 | 22.5 |
| Crease          Height | 0 mm | 0 mm | 0.5 mm | 0 mm |
|                    Visual | ○ | ○ | ○ | ○ |
| International Rubber Hardness Degree | 86.3 | 87.7 | 97 | 87.6 |
| M100 (MPa) | 2.46 | 3.98 | 6.51 | 4.70 |
| M300 (MPa) | 13.30 | 28.90 | 26.00 | — |
| Tensile strength (MPa) | 75.15 | 95.38 | 99.38 | 24.20 |
| Breaking elongation (%) | 407 | 395 | 427 | 240 |
| Tear strength (N/mm) | 37.4 | 49.0 | 70.6 | 40.0 |
| Permanent elongation (%) | 2.1 | 1.0 | 3.1 | 0.9 |

| | Comparative Example 1 | Comparative Example 2 | Comparative Example 3 | Comparative Example 4 |
|---|---|---|---|---|
| Stress relaxation value (MPa) | 2.25 | 2.04 | 2.11 | 1.43 |
| Stress relaxation rate (%) | 41.7 | 35.0 | 36.3 | 42.9 |
| Crease          Height | 6 mm | 7 mm | 2 mm | 4 mm |
|                    Visual | x | x | x | x |
| International Rubber Hardness Degree | 95.1 | 95.9 | 97.2 | 92.7 |
| M100 (MPa) | 9.39 | 10.95 | 11.85 | 10.75 |
| M300 (MPa) | 55.15 | 70.29 | 78.00 | 44.80 |
| Tensile strength (MPa) | 94.50 | 89.28 | 93.30 | 99.00 |
| Breaking elongation (%) | 351 | 323 | 316 | 412 |
| Tear strength (N/mm) | 93.8 | 93.9 | 99.2 | 103.2 |
| Permanent elongation (%) | 5.7 | 6.9 | 7.3 | 10.4 |

Even after the surface protection films obtained in Examples 1 to 4 of the present invention that were folded were left for 7 days, creases were unlikely to remain, and in particular, in the surface protection films obtained in Examples 1, 2, and 4, no creases remained. In addition, in the surface protection film of the present invention, no distortion was observed in the shape shown in the crease portion.

After the surface protection films obtained in Comparative Examples 1 to 4 that were folded were left for 7 days, creases remained, and the shape shown in the crease portion was distorted.

The invention claimed is:

1. A surface protection film for a flexible display having a protection layer formed of a polyurethane on an outermost surface of the surface protection film for a flexible display, the polyurethane is a polycarbonate-based polyurethane that is a cured product of a material composition containing a polycarbonate polyol, an isocyanate, and an alcohol-based curing agent, wherein in the material composition, an α ratio which is a ratio of the number of moles of hydroxyl groups (—OH) included in the alcohol-based curing agent to a number of moles of isocyanate groups (—NCO) of the isocyanate (—OH/—NCO) is 1.05 or more and 1.3 or less, a number-average molecular weight of the polycarbonate polyol is 800 or more and 3,000 or less, the alcohol-based curing agent contains 1,4-butanediol in a range of 60 to 80 parts by weight, and trimethylolpropane in a range of 20 to 40 parts by weight, wherein the stress relaxation rate of the polyurethane after 300 seconds at an elongation of 50% is 30% or less.

2. The surface protection film for a flexible display according to claim 1, wherein the thickness of the protection layer is 50 μm or more and 400 μm or less.

3. The surface protection film for a flexible display according to claim 1, wherein the stress relaxation value of the polyurethane after 300 seconds at an elongation of 50% is 2 MPa or less.

4. The surface protection film for a flexible display according to claim 3, wherein the International Rubber Hardness Degree (IRHD) of the polyurethane is 87.0 or more and 98.0 or less.

5. The surface protection film for a flexible display according to claim 3, wherein the thickness of the protection layer is 50 μm or more and 400 μm or less.

6. The surface protection film for a flexible display according to claim 1, wherein the International Rubber Hardness Degree (IRHD) of the polyurethane is 87.0 or more and 98.0 or less.

7. The surface protection film for a flexible display according to claim 6, wherein the thickness of the protection layer is 50 μm or more and 400 μm or less.

* * * * *